United States Patent

[11] 3,575,546

[72] Inventor James P. Liautaud
141 Grissom Lane, Hoffman Estates, Ill. 60172
[21] Appl. No. 13,287
[22] Filed Feb. 24, 1970
[45] Patented Apr. 20, 1971

[54] HEADER AND SHELL ENCASEMENT FOR ELECTRONIC COMPONENTS AND THE LIKE
2 Claims, 5 Drawing Figs.

[52] U.S. Cl. .......... 174/50.52, 29/453, 174/50.54, 174/52PE, 264/272
[51] Int. Cl. .......... H05k 5/00
[50] Field of Search .......... 174/52 (PE), 50, 50.5, 50.52, 50.54; 264/272; 220/60; 29/453; 317/101 (CC), 101 (C), 101

[56] References Cited

UNITED STATES PATENTS 3,056,898 10/1962 Knockhel et al. .......... 29/453X
3,429,980 2/1969 Guttmann .......... 220/60X

*Primary Examiner*—Darrell L. Clay
*Attorney*—Greist, Lockwood, Greenawalt & Dewey

ABSTRACT: Electronic components are mounted to the back side of a plastic header having electrical connectors passing therethrough. The resulting header is snapped into place in the mouth of a closely fitting plastic shell to complete the enclosure of the electronic components. The header and shell are manufactured from strong, resilient plastic. The header-shell combination includes detent means positioned along one pair of opposite edges which continuously exert a camming action which compresses a peripheral inner face of the header against an opposing shoulder on the shell to provide a compression seal. Once snapped, however, it is extremely difficult to remove the header from the shell.

In a preferred method utilizing the novel header and shell, the shell is initially partially filled with a hardenable liquid. When the header and components are snapped in place, the components are embedded in the hardenable liquid. The resulting assembly is immediately ready for shipment, storage, or use, without curing delay, or further special handling.

INVENTOR:
JAMES P. LIAUTAUD

HEADER AND SHELL ENCASEMENT FOR ELECTRONIC COMPONENTS AND THE LIKE

It has been common practice to provide protective enclosure for electronic assemblies by immersing the assemblies in hardenable potting liquid, by enclosing the assemblies within a can or other shell, or by otherwise molding an encapsulating resin around them.

The art heretofore available suffered from numerous disadvantages. For example, simply enclosing electronic components, e.g., those mounted on a small plate, by dipping or immersing the components in a relatively viscous hardenable liquid may have provided adequate environmental and electrical protection. But this technique suffered the disadvantage of leaving the article somewhat irregular in shape, or of requiring special handling until the resinifiable liquid hardened. In the header-shell combinations heretofore available, it has been thought necessary to seal the header to the shell, e.g., by adhesion using a resinifiable plastic such as epoxy, and permitting the adhesive to set, or by forming a seal by compressing, mechanically, the header against opposing elements on the shell e.g., by crimping a radially extending edge of a can around the periphery of a header. This practice, of course, involves the use of specialized equipment.

Environmental and electrical protection has also been achieved heretofore by injection molding of encapsulating resin around electronic components. This, of course, provided an ultimate in precision of external configuration. Inherent in this practice, of course, was either use of relatively expensive molds and transfer molding equipment (which most producers of a relatively small number of electronic components could ill afford), or the inconvenience of shipping preassembled electronic components to a custom encapsulator (which the small producer tended to do) with inherent risk of damage en route.

Also available for providing environmental and electrical protection have been the potting method for parts that are assembled in a container or can into which an insulating material is poured, with the container remaining an integral part of the outer surface of the finished unit. It is my understanding that the heretofore available potting methods required that special handling be provided until the insulating material had hardened.

It is an object of this invention to provide a header and shell assembly which virtually eliminates all the shortcomings inherent in the heretofore available art, and yet which gives up virtually none of the beneficial aspects of the best practices.

It is a further object of this invention to provide environmental and electrical protection for electronic assemblies, which protection can be utilized by manufacturers of relatively small batches of electronic components.

It is another object of this invention to provide a header and shell combination which eliminates any need for special handling of an assembled electronic component after it has been coated with, or immersed in, a potting liquid, permitting immediate packaging, and shipping, or use of the component.

It is another object of this invention to provide a header and shell combination, and encasement method, which can be used with great versatility, in encasement of electronic components, thereby eliminating the need for a multitude of types of closures and different kinds of encapsulating operations for each of many types of product components. It is a further object of this invention to provide a header and shell combination which requires the use of no special tools or tooling in order to secure an operational closure therebetween.

It is another object of this invention to provide a header and shell combination which provides a continuously exerted compression between an inner face of the header and a shoulder on the shell to effectively seal the resulting enclosure from dust, etc., and to provide an almost perfect hermetic seal therebetween. These and other objects which will be apparent hereinafter are all achieved in accordance with this invention described in detail hereinafter.

A header and shell combination, manufactured from strong, resilient plastic, is provided with a pressure seal therebetween, by detent means which cause abutting sealing members to be continually compressed. The detent means require no special equipment to be made operational. Compression results from a critical relationship between the detent means on the header, and on the shell, and the distance of these elements on their respective members above a shoulder on the shell.

Figure 1:
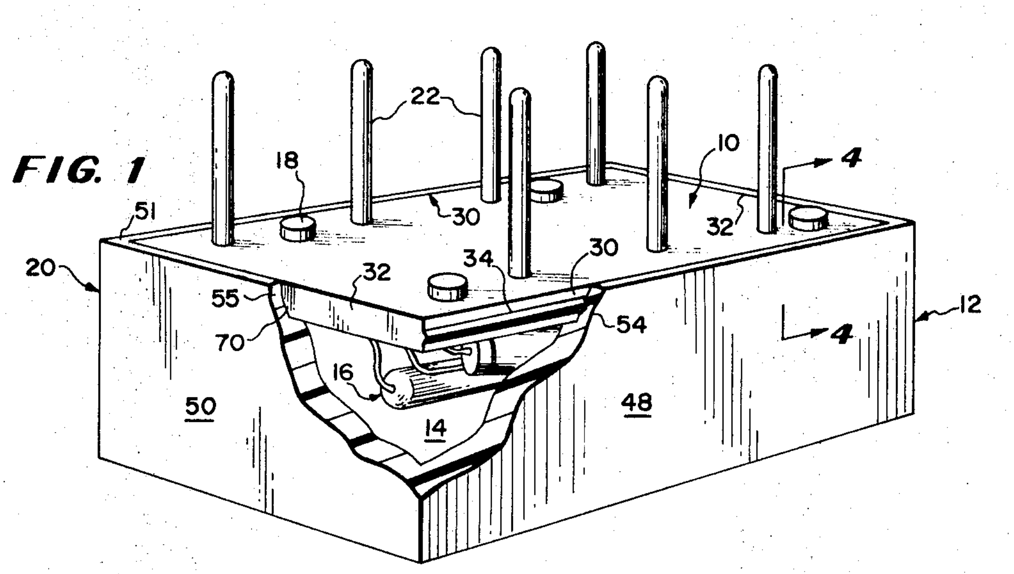
FIG. 1 is a partially cutaway perspective view showing an electronic component encased in accordance with this invention.

In accordance with this invention header, generally 10, is securely fastened to shell, generally 12, to define enclosed region 14 in which electronic components, generally 16, reside in electrical and environmental security. Truncated columns 18 on the external surface of header 10 serve as spacers to maintain the assembly 20 comprising header 10, shell 12, and electronic components 16, spaced apart from the face of a connected unit (not shown).

In accordance with this invention electrical connectors, generally 22, are molded in place in header 10 and include external portion 24, knurled, embedded portion 26, and internal portion 28 to which mounted components 16 are electrically connected. Header 10, in the illustrated embodiment, is substantially elongated and includes long lateral edges 30 and relatively shorter end edges 32. Elongated edge 30 is provided with rib 34 which extends, in the illustrated embodiment, substantially along the entire length thereof. In the illustrated embodiment rib 34 is substantially V-shaped having outer slope 36 and inner slope 38 which meet edge 30 at obtuse angles an measured from the outer face 40 and inner face 42 of header 10 respectively. Rib 34 need not be precisely V-shaped, but it is essential that outer and inner edges 36, 38 respectively of rib 34 have the obtuse-angle taper, at least in the portion thereof which encounters shell 12. Thus rib 34 may alternatively have the rounded configuration of the bottom of a U. This requirement is essential for the proper functioning of the combination as will be appreciated more fully from the explanation hereinafter.

In the illustrated embodiment shell 12 is substantially rectangular, having a long and narrow dimension, and including bottom 46, long sidewalls 48 and narrow sidewalls 50. Adjacent upper edge 51 of sidewalls 48, 50 and at the inner portions of sidewalls 48, 50 is shoulder 52. Sidewalls 48, 50 extend beyond shoulder 52 as relatively narrow extensions of sidewalls 48, 50, respectively. A V-shaped recess 58 is provided in inner wall 60 of extension 54. Thus recess 54 includes outer side portion 62 and inner side portion 64 which meet at lowest point 66 of recess 54. In the illustrated embodiment, particularly FIG. 4 it is noted that the highest point 68 of rib 34 is not aligned with lowest point 66 of recess 58.

Inner face 70 of extended portion 55 at opposing end walls includes no recess, or other detent means and, as set forth above, edge 32 of header 10 which is opposite inner face 70 in assembly 20 includes no detent means either.

The main portion of header 10, that is, except for ribs 34, is sized to fit easily within the mouth of shell 12, the mouth being defined as the general region between opposing surfaces 60, and opposing surfaces 70, of extensions or lips 54, 55, respectively. Ribs 34, though otherwise matable with recesses 58 are positioned on edges 30 slightly higher from inner face 42 of header 10 than recesses 58 are positioned on inner faces 60. This is perhaps best appreciated from a consideration of FIG. 4 in which $H_1$ is the difference in the level as measured along sidewalls 48 between shoulder 52 and apex 56 of recess 58, and in which $H_2$ is the difference in level as measured along sidewalls 48 between inner face 42, resting on shoulder 52 and apex 68 of rib 34. Thus $H_2$, the height of rib 34 above shoulder 52, is significantly greater than $H_1$, the height of recess 58 above shoulder 52.

Figure 4:
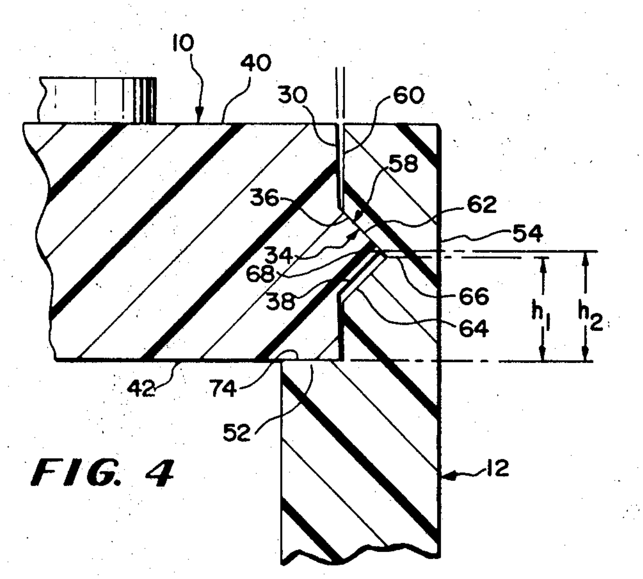
FIG. 4 is a greatly enlarged fragmentary cross-sectional elevational view taken approximately along the line 4–4 of FIG. 1.

It is also noted that in its initial condition inner face 60 is substantially perpendicular to shoulder 52. Likewise edge 30 is substantially normal to outer and inner faces 40, 42 of header 10. In FIG. 4, however, it is clear that lips 54 are flexed slightly outwardly, and the beneficial effect of this will be discussed hereinafter.

Figure 5:
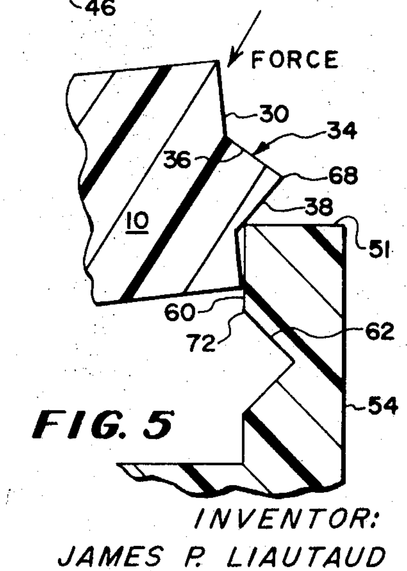
FIG. 5 is a greatly enlarged fragmentary cross-sectional view taken approximiately along the line 4–4 of FIG. 1, except that it shows a portion of the header in the process of being mated with a portion of the shell.

In accordance with this invention, electronic components 16 are electrically connected to internal portions 28 of connectors 22. The header-electronic component assembly is then easily snapped into place in shell 12 as follows. Header 10 is placed partially within the mouth of shell 12 by inserting one edge 32 closely adjacent one edge 60 of shell 12. In this position narrow edges 32 easily move next to surfaces 70 of shell 12, although the other long edge 34 remains above shell 12. In this condition the inserted edge of header 10 is resting on shoulder 52 either along sidewalls 50, or along sidewall 48. The header is then moved generally parallel to shoulder 52 to bring inserted rib 34 into partially mating relationship with recess 58. In this condition outer tapered surface 36 of rib 34 bears against outer tapered surface 62 of recess 58 and the result of pushing header 10 toward surface 60 is that of camming face 42 downwardly against shoulder 52. In this partially mated condition of header 10, the opposite edge 30 of header 10 can drop partially within the mouth, i.e., along face 60 as illustrated in FIG. 5, until inner tapered surface 38 encounters top edge 51. Continued applied force, preferably exerted in the general direction indicated by the marked arrow in FIG. 5 brings header 10 downwardly, distorting or flexing extension 54 outwardly, and distorting resilient rib 38 as it moves along inner face 60. As soon as apex 68 of rib 34 passes juncture 72 of recess surface 62 in inner face 60, the "memory" or inherent resilience of rib 48 urges apex 68, and outer surface 36 of rib 34 against recess surface 62, thus snapping or camming this header 10 downwardly. However, because of the critical relationship, described hereinbefore, between the positioning of rib 34 and recess 58, rib 34 cannot fully mate with recess 58 since adequate downward movement is obstructed by shoulder 52. Thus lips 54 remain slightly flexed outwardly as illustrated in FIG. 4, and ribs 34 remain slightly distorted due to the pressure between angle surface 36 and angle surface 62. Thus, the resulting tension continuously urges header 10 in a downward direction with the result that outer portion 74 of inner face 42 of header 10 is tightly compressed against shoulder 52 around the entire periphery of header 10. Thus the camming action continuously exerted by the detent means, generally 78, of the header-shell combination provides for continuous compression of header 10 against shoulder 52 of shell 12 around its entire periphery.

Some warpage is commonly encountered in the manufacture of headers by injection molding. This is particularly true when slight temperature differentials exist between opposing halves of molds. A bow of at least 0.001 inch to several thousandths of an inch is commonly encountered in normal practice. That is, the middle portion of a header is slightly above or below ends 32 when the header is approximately horizontal. However, because of the width of the V-recess 58 and because of the biasing, camming action resulting from the pressure between side 36 of rib 34 and side 62 of recess 58, and because of the fact that shoulder 52, in accordance with this invention, abuts portion 74 of header 10 before rib 34 can be fully mated, the slight bow of header 10 is automatically corrected. Therefore, in spite of the less than perfect flatness of portion 74 along the longitudinal dimension, a tight compression seal between portion 74 and shoulder 52 is continuously maintained.

Figure 2:
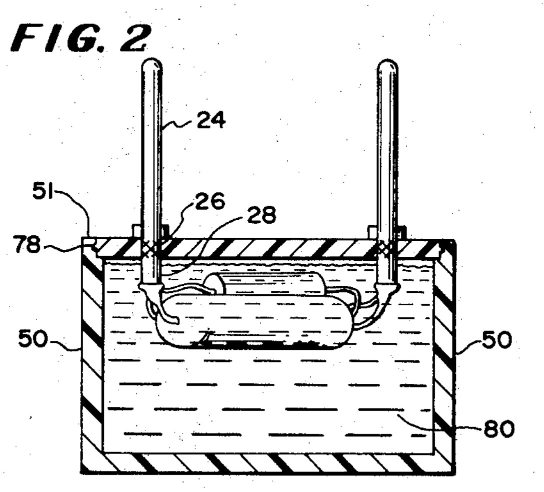
FIGS. 2 and 3 are middle cross-sectional elevational views taken across the narrow dimension of the article illustrated in FIG. 1 and they illustrate alternative preferred uses of the encasement article of this invention.

In accordance with a preferred use of the encasement of this invention a polymerization-catalyzed hardenable potting liquid 80 is placed in shell 12. Header 10, with electronic component 16 mounted thereon, is then snapped into place in shell 12 embedding component 16 in liquid 80. The quantity of potting liquid 80 initially placed in shell 12 is preferably sufficient to cover the electronic component 16 mounted on header 10 when header 10 and component 16 are snapped into place as illustrated in FIG. 2. In one alternative embodiment a smaller quantity of potting liquid is placed in shell 12. Header 10 and component 16 are snapped in place, and component 20 is inverted to immerse components 16 in potting liquid 80, leaving an air space against now upper bottom 46.

Figure 3:
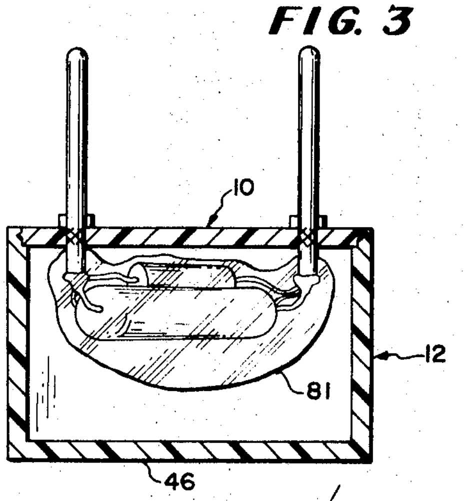

In another alternative operation or method, illustrated in FIG. 3, electronic components 16 mounted on header 10 are dipped into a potting liquid 81 and withdrawn therefrom. Components 16 remain coated with a globule of potting liquid 81. The thus coated electronic components 16 and header are then snapped into place in shell 12 to provide the embodiment suggested in FIG. 3. The assembly resulting from any of the above novel potting methods can be packaged and shipped, or used immediately, without the need to wait for hardening, and without further special handling. Because of the continuously maintained compression fit between portion 74 and shoulder 52 none of the potting liquid is lost from enclosure 14 once header 10 is snapped into place.

Shoulder 52 extends completely around walls 48, and 50, but detent means are present only on one pair of opposing sides of assembly 20. The other pair of opposing sides is free of interference which would obstruct or restrict the easy movement of header 10 within shell 12 prior to its engagement with shoulder 52.

In regard to the size of the electronic components manufactured in accordance with this invention, it should be noted that relatively large components, e.g., shell 12 having a dimension between one and one-half to three inches, as well as relatively small components, e.g., those having a maximum dimension less than one and one-half inches, more commonly less than one inch, may be improved in accordance with this invention. The plastics utilized in the manufacture of header 10 and shell 12 must be strong, stiff and resilient.

The use of the compression-fit header and shell combination of this invention is particularly advantageous for the larger size header-shell components although components approximately three-eighths inch wide by three-quarters inch long advantageously utilize this invention. The thickness of the sidewalls of shell 12 in such a smaller component may be for example one thirty-second inch and the thickness of header 10 may also be one thirty-second inch. In such an embodiment the height of the V rib 34 may be, for example 0.003 to 0.004 inch, whereas the distance between the juncture of tapered side 36 and tapered side 38 at sidewall 60 may be, typically, 0.025 inch.

As stated above the header 10 and shell 12 are preferably manufactured by injection molding of stiff, strong but slightly flexible, resilient plastic. Injecting moldable mineral-filled phenolic resins, mineral-filled epoxy resins, general purpose phenolic resins and any other moldable plastic with physical and electrical properties suitable for the intended application, can be used in the manufacture of the header 10 and shell 12 of this invention.

Resins which are quire pliable are unsuitable for use in accordance with this invention for the manufacture of header 10 and shell 12. It is essential that header 10 and shell 12 be manufactured from stiff, resilient material. In the method described above in which the polymerization-catalyzed hardenable potting liquid is employed, I consider room temperature catalyzed epoxy resin to be a best mode, a most preferred liquid. However the selection of a particular potting liquid, as in the selection of a particular header or shell material, is made primarily on the basis of the physical and electrical requirements. Use of other hardenable liquids, and non-hardenable liquids as embedding liquids in this invention is also contemplated. The art of selection and use of potting liquids is well developed, and the article and method of this invention does not hinge on the use of any particular potting material. Also, the potting material may be heat cured, and the maximum temperatures employed would depend on the heat tolerances of the materials used for header 10 and shell 12 as well. Obviously header-shell materials must be selected to be compatible with the potting liquid and vice versa. The potting liquid using the so-called high-solids binder systems are most preferred. These resins are liquid, require virtually no liquid solvent, and yield almost 100percent "solids" upon hardening, or resinification.

Generally speaking resinifiable epoxy, silicone, and polyurethane liquids are eminently satisfactory for use in accordance with this invention as potting liquids 80.

This invention provides a header and shell combination which cuts through most of the electronic component encapsulation production bottlenecks heretofore encountered, without giving up the desirable attributes of the best methods heretofore available. When electronic components 16 are properly mounted, i.e., assembled, on headers 10, headers 10 are reliably retainable by shells 12 after simple, quick assembly which requires no specialized tools. Once mating has occurred, header 10 is so securely fastened to the shell 12 that shell 12 can serve as a handle for the purpose of withdrawing electrical contact 22 from electrical connection with another component.

Moreover because of the continuously exerted compression between header and shell, in accordance with this invention, enclosure 14 is sealed, and it is impossible for potting liquids contained therein to leak out of enclosure 14. Moreover because of the built-in clearance between opposing edges of header 10 and opposing wall of shell 12 speedy assembly is assured.

If a room temperature potting liquid is provided in the liquid-tight compartment 14, the assembled unit may be shipped instantly upon mating of header and shell. Thus, the need for encapsulating machinery, curing delays, special glues or cements, special fastening tools, and special fastening equipment is eliminated. By providing electrical connectors 22 which are molded in place in header 10, an additional guarantee of a tight seal is assured. I have found that terminal strengths are exceptional—that lead 22 withstood up to 20 pounds of pull in actual tests. The resulting package 20 is suitable, providing plastics with proper physical and electrical characteristics are used in the manufacture of shell 12 and header 10, for high voltage application. The resulting package 20 is suitable, providing plastics with proper physical and electrical characteristics are used in the manufacture of shell 12 and header 10, for high voltage application. The resulting package 22 is substantially impervious to environmental contamination. Both thermoplastic and thermoset materials in the manufacture of the header and shell, are contemplated.

As indicated above, the injection molding of relatively planar elements such as a header almost invariably results in a slightly warped element. In accordance with this invention the warpage does not constitute a problem because the header-shell combination of this invention generates substantial tension which corrects the warpage and which provides a continuously exerted compression between seal members. The package is made liquid-tight as a result of the continuous compression between opposing members.

In accordance with this invention, assembled electronic components utilizing liquid potting compounds may be packaged and shipped, or used, immediately, that is, without waiting for the potting compound to cure.

The assembled unit has superior esthetic appearance over shells and headers heretofore available, in my opinion.

It is extremely difficult to remove header 10 from shell 12 even though no potting liquid is used. In those embodiments in which no potting liquid is used, header 10 can be removed from shell 12 for servicing of electronic components contained therein if desired. For example, a needle-nose type pliers having a substantially parallel bite can be used to engage all the contacts 22 along one side of header 10 and to draw that edge away from shell 12 using a rolling or angularly directed force pivoting header 10 around the opposite edge 32 of the header 10 again snaps easily and speedily into shell 12. However it is impossible to remove header 10 from shell 12 when shell 12 is filled with hardenable potting compound, once potting compound 80 has solidified.

In addition, this package fills the need of those electronic component manufacturers who require a dustproof and water proof but not hermetically sealed package for electronic components. Prior to this invention the electronic component manufacturer was virtually forced to choose between protecting and electronic circuit by potting in an encapsulant, or by putting it in a hermetically sealed metal can and metal header. This invention allows the industry to package a component without an encapsulant, and for far less money than required when using a hermetically sealed metal can and header. Yet if potting is required, this package expedites potting, inasmuch as a separate cure step is eliminated, and moreover the resulting package is precisely, and aesthetically appointed. No special tools are required to complete the closure, and yet the package of this invention lends itself well to automated assembly.

I claim:

1. As an article of manufacture, a two-component preformed plastic electronic component container comprising:

a mating shell and header and detent maintaining said header in said shell, the header having electrical connectors passing therethrough and sealed therein, said header having an inner face and an outer face, the shell having a rectangular mouth with an opening receiving the header therein, said shell having seating means around the entirety of said mouth providing a surface against which a peripheral portion of the inner face of said header rests;

detent means maintaining said header in said shell, said header having a pair of relatively long oppositely facing edges, and a pair of relatively short oppositely facing edges, said opening having a pair of relatively long opposing sidewalls, and a pair of relatively short opposing sidewalls;

each of the edges on the header being closely opposite to corresponding respective sidewalls of said opening, the respective relatively short sidewalls and edges being free of detent means therebetween, the respective relatively long sidewalls and long edges having said detent means therebetween, said detent means comprising mating rib and recess means extending substantially the entire length of said long edges and sidewalls, said rib means being positioned along said long edges of said header, said recess means being positioned along the long sidewalls of said opening;

said rib and recess means including respective tapering inner and outer tapered edges having an apex, the height of the apex of the rib means above the level of the inner face of the header being such that the apex of the header is compressed by the outer tapered edge of the recess means, whereby said peripheral portion of the header inner face is compressed against the seating means;

said header and said mouth being dimensioned to provide spacing between said sidewalls and said edges sufficient for movement of the header within the mouth during insertion of the header into the opening, and sufficient to provide compression of said rib means in said recess means when said inner face of said header rests on said seating means.

2. As an article of manufacture, a two-piece preformed electronic component container comprising:

a mating shell and header, the header having electrical connectors passing therethrough and sealed therein, the header having an inner face and an outer face, said shell and said header having cooperating elements of detent means retaining said header in said shell;

said shell having a rectangular mouth having an opening receiving the header therein, said shell having seating means around the entire periphery of said mouth providing a surface against which a peripheral portion of the inner face of said header rests, said header having a pair of relatively long oppositely facing edges, and a pair of relatively short oppositely facing edges, said opening having a corresponding pair of relatively long opposing sidewalls, and a pair of relatively short opposing sidewalls, each of the edges on the header being closely opposite corresponding respective sidewalls of said opening, the respective relatively short sidewalls and edges being free of detent means therebetween, the respective relatively long sidewalls and long edges having detent means therebetween, said detent means being operative by the relative movement of the header and shell while being mated without substantially changing the configuration of the header and shell, said detent means including means for biasing said peripheral portion of the inner face against said seating means.